US012790764B2

(12) United States Patent
Auer et al.

(10) Patent No.: US 12,790,764 B2
(45) Date of Patent: Nov. 10, 2026

(54) METHOD AND SYSTEM FOR DETECTING VIBRATIONS TRANSMITTED IN THE AREA OF A TRACK

(71) Applicant: PLASSER & THEURER EXPORT VON BAHNBAUMASCHINEN GESELLSCHAFT M.B.H., Vienna (AT)

(72) Inventors: Florian Auer, Vienna (AT); Bernhard Antony, Stockerau (AT); Fritz Kopf, Vienna (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 697 days.

(21) Appl. No.: 18/248,932

(22) PCT Filed: Sep. 16, 2021

(86) PCT No.: PCT/EP2021/075408
§ 371 (c)(1),
(2) Date: Apr. 13, 2023

(87) PCT Pub. No.: WO2022/078698
PCT Pub. Date: Apr. 21, 2022

(65) Prior Publication Data

US 2023/0383476 A1 Nov. 30, 2023

(30) Foreign Application Priority Data

Oct. 16, 2020 (AT) .............................. A 50890/2020

(51) Int. Cl.
*E01B 35/00* (2006.01)
*B61L 1/06* (2006.01)
(Continued)

(52) U.S. Cl.
CPC ................ *E01B 35/00* (2013.01); *B61L 1/06* (2013.01); *B61L 27/20* (2022.01); *G01H 1/00* (2013.01)

(58) Field of Classification Search
CPC . E01B 35/00; B61L 27/20; B61L 1/06; G01H 1/00
(Continued)

(56) References Cited

U.S. PATENT DOCUMENTS 5,265,831 A 11/1993 Muller
2016/0334543 A1* 11/2016 Nagrodsky ............... B61L 1/06
(Continued)

FOREIGN PATENT DOCUMENTS

AT 520056 A1 12/2018
AT 521420 A1 * 1/2020 ................ B61L 1/06
(Continued)

OTHER PUBLICATIONS

AT-521420-A1 (Jan. 15, 2020) (Machine Translation) (Year: 2020).*

*Primary Examiner* — Lindsay M Low
(74) *Attorney, Agent, or Firm* — Laurence A. Greenberg; Werner H. Stemer; Ralph E. Locher

(57) ABSTRACT

A method detects vibrations transmitted in the area of a track, with the track being vibrated during a work process by a work unit of a track maintenance machine travelling along the track. The vibrations being transmitted via the track are measured by a sensor distanced from the work unit and with measuring data of the sensor being evaluated in an evaluation device. In that, a position of the sensor with respect to the work unit is given to the evaluation device, with a correlation between a vibration effect of the work unit detected with the sensor and a distance between the work unit and the sensor being calculated in the evaluation device. The method has the advantage that the vibration effect of the
(Continued)

work unit can be detected in real time at the location of the sensor.

16 Claims, 5 Drawing Sheets

(51) Int. Cl.
*B61L 27/20* (2022.01)
*G01H 1/00* (2006.01)

(58) Field of Classification Search
USPC .......................................................... 701/19
See application file for complete search history.

(56) References Cited

U.S. PATENT DOCUMENTS

| | | | | |
|---|---|---|---|---|
| 2017/0184450 | A1 | 6/2017 | Kobayashi | |
| 2018/0010302 | A1* | 1/2018 | Padovani | F04B 49/065 |
| 2020/0181850 | A1 | 6/2020 | Kopf et al. | |
| 2021/0140122 | A1 | 5/2021 | Wilczek et al. | |
| 2021/0395954 | A1 | 12/2021 | Bernhard et al. | |

FOREIGN PATENT DOCUMENTS

| | | | | |
|---|---|---|---|---|
| AT | 521481 | A4 | 2/2020 | |
| DE | 102019102303 | A1 | 7/2020 | |
| WO | 9110584 | A1 | 7/1991 | |
| WO | WO-2019129448 | A1 * | 7/2019 | E01B 27/16 |
| WO | 2020011517 | A1 | 1/2020 | |

* cited by examiner

METHOD AND SYSTEM FOR DETECTING VIBRATIONS TRANSMITTED IN THE AREA OF A TRACK

FIELD AND BACKGROUND OF THE INVENTION

The invention relates to a method for detecting vibrations transmitted in the area of a track, with the track being vibrated during a work process by means of a work unit of a track maintenance machine travelling along the track, with vibrations transmitted via the track being measured by means of a sensor distanced from the work unit and with measuring data of the sensor being evaluated in an evaluation device. The invention further relates to a system for carrying out the method.

PRIOR ART

A generic method is known from AT 521 420 A1. This method uses a track maintenance machine with work units travelling on a track. During a work process, vibrations are introduced into the track by means of the work units and used to calibrate a sensor extending along the track. In the process, the vibration transmission in the area of the track is detected by deriving a characteristic of the vibration transmission from vibration values of the work units, from position data of the track maintenance machine and from measuring data of the sensor by means of an evaluation device.

The sensor calibrated in this way can then be used to monitor a track line. Specifically, the sensor is used to locate sources of sound or vibration on the monitored track section. Current positions of rail vehicles travelling on the track line are of particular interest. Equally, defects that occur along the track line can be detected by means of the sensor. For example, imperfections of the track, such as corrugations at the rail head, waviness of the track, voids, defective sleepers, and the like can be detected by a modified sound propagation.

SUMMARY OF THE INVENTION

The object of the invention is to improve a method of the kind mentioned above in such a way that a work process carried out with a track maintenance machine is more efficient and free of disruptions. A further object of the invention is to indicate an improved system for efficient and disruption-free operation of the track maintenance machine.

According to the invention, these objects are achieved by the features of independent claims. Dependent claims indicate advantageous embodiments of the invention.

Therein, a position of the sensor with respect to the work unit is given to the evaluation device, with a correlation between a vibration effect of the work unit detected with the sensor and a distance between the work unit and the sensor being calculated in the evaluation device. According to the invention, the position of the sensor is thus used to evaluate a location-dependent vibration effect of the work unit. Specifically, the detected vibration effect is correlated to the distance of the sensor from the work unit.

In contrast, the known method according to AT 521 420 A1 mentioned above for calibrating the sensor does not take into account the position of the sensor or the distance between sensor and work unit. Only the position of the work unit is detected and evaluated together with a sensor signal in order to compare the sensor signal with the position of the work unit.

The present method according to the invention has the advantage that the vibration effect of the work unit can be detected in real time at the location of the sensor. This information can be used to optimise the work process of the track maintenance machine and at the same time prevent damage to facilities and installations in the vicinity of the track. The method according to the invention allows detection of the propagation of the vibrations caused by the track maintenance machine and observation of facilities and installations requiring protection in the vicinity of the track maintenance machine during the process.

Advantageously, an acceleration and/or a vibration velocity is measured by means of the sensor to detect the vibration effect of the work unit. In particular, a stationary sensor is used to measure accelerations or vibration velocities in three orthogonal spatial directions. It is useful if the sensor is coupled with a processor to perform a local partial analysis of the detected sensor values.

A further development of the method provides that measuring data of the sensor and preferably position data of the sensor are transmitted to the evaluation device via a wireless data connection. The transmission of position data is useful if the position of the sensor has not yet been given to the evaluation device by a machine operator or by means of transmission from a data memory.

For example, the sensor is coupled with a GNSS receiving device to determine the position of the sensor. A corresponding sensor unit comprises a power storage medium to supply the sensor, the GNSS receiving device and, if applicable, an analysis processor with energy. The advantage of such a sensor unit is its flexible usability. The attachment to a facility or an installation requiring protection is only temporary in order to monitor the vibration effect of the track maintenance machine.

A further improvement of the method provides that characteristic parameters of a vibration generated by the work unit are given to the evaluation device and that the measuring data are compared with these characteristic parameters. For example, operating parameters of a vibration drive are used as characteristic parameters of the generated vibration (e.g. rotational speed of an eccentric drive).

Additionally or alternatively, it is useful to record vibration parameters directly on the work unit by means of appropriate sensors. In this way, the vibrations at the work unit are measured during the process and the vibrations in the environment are measured simultaneously. The recorded data of the emissions (dynamic excitation by the machine) and the immissions (vibrations detected by the sensor) are subsequently set into geometric relation.

Herein, it is advantageous if the track is vibrated by means of several work units of the track maintenance machine at points that are distanced from each other and if the measuring data are assigned to the corresponding work unit on the basis of the respective characteristic parameters of the vibration generated by the respective work unit. For example, the vibrations are caused by a tamping unit and by a stabilising unit (Dynamic Track Stabiliser, DGS). Other units (sleeper-end compactor, sleeper-crib compactor, etc.) can also be used as sources of vibration in accordance with the invention. In this case, an evaluation algorithm is set up in the evaluation device to distinguish between the vibration immissions caused by the track maintenance machine and those originating from other sources on the basis of the specified characteristic vibration excitation.

Furthermore, the method is improved by deriving a transmission function and/or a decay function from the detected correlation by means of the evaluation device. Transmission functions or decay functions reflect the local conditions and enable a real-time forecast for the propagation of vibrations.

It is therefore advantageous if a continuous vibration forecast is calculated by means of the evaluation device using the transmission function and/or decay function. These forecasts form the basis for decisions as to whether measures to reduce the vibrations will be required if the protected object monitored by the sensor is approached further. The effectiveness of the measures taken can be recognised immediately based on the sensor's measuring data transmitted to the evaluation device.

In a further development of the method, the positions of several sensors are given to the evaluation device, with a correlation between the detected vibration effect and the associated distance between the work unit and the sensor being calculated in the evaluation device for each sensor. In this way, several stationary measuring points are monitored simultaneously.

An improvement of the entire work process is achieved by automatically controlling the track maintenance machine depending on an output value of the evaluation device. This ensures compliance with specified vibration limits without burdening a machine operator with this task.

Advantageously, in this improvement the output value is compared with a threshold value, with a process parameter of the work process being changed in particular when the output value approaches the threshold value. For example, a reduction of the vibrations is achieved (e.g. regulating the vibration amplitude of the work unit) if a detected vibration effect reaches the specified threshold value at one or more measuring points.

In a further embodiment of the invention, a vibration propagation in the longitudinal direction of the track is detected by means of a sensor arranged on the track maintenance machine. This on-track measurement of the vibration propagation allows an assessment of the system rigidity (track panel—subsoil).

Advantageously, the method is further developed by calculating a numerical model of an interaction system formed by the track maintenance machine and the track; soil-mechanical parameters are calculated in particular by means of the numerical model. In this way, a comprehensive assessment of the subsoil can be carried out.

The system according to the invention for carrying out one of the described methods has a track maintenance machine comprising a work unit for vibrating a track travelled on by the track maintenance machine. In addition, the system includes a sensor distanced from the work unit to measure vibrations transmitted via the track. Here, the track maintenance machine further comprises an evaluation device that is given a position of the sensor with respect to the work unit, with the evaluation device being set up to calculate a correlation between a vibration effect of the work unit detected with the sensor and a distance between the work unit and the sensor. The result is available online to a machine operator of the track maintenance machine so that there is sufficient time for reacting to an imminent exceedance of guide values and such an exceedance can be demonstrably prevented. The work unit is influenced manually or by an automatic control of process parameters. In addition, compliance with limiting values can be documented in real time.

In an advantageous further development, the sensor is coupled with a position detection system and a transmission device for transmitting position data, with the track maintenance machine comprising a receiving device for receiving the position data. In this way, an automated update of the position data, which is given to the evaluation device with respect to the work units, takes place after a position change of the sensor and/or the track maintenance machine.

In another advantageous further development, the sensor is arranged on the track maintenance machine and is designed in particular as an acceleration sensor arranged on a rail-based running gear. Thus, the propagation of vibrations in the longitudinal direction of the track maintenance machine is detectable in order to determine the system rigidity of the track. Based on these results, the assessment of the homogeneity of the compaction success of a work unit (tamping unit, stabilising unit, etc.) that compacts a ballast bed of the track can be verified. In addition, the load-bearing behaviour of the maintained track or subsoil can be determined.

BRIEF DESCRIPTION OF THE FIGURES

In the following, the invention is explained by way of example with reference to the accompanying figures. The following figures show in schematic illustrations.

DETAILED DESCRIPTION OF THE INVENTION

Figures 1, 2:
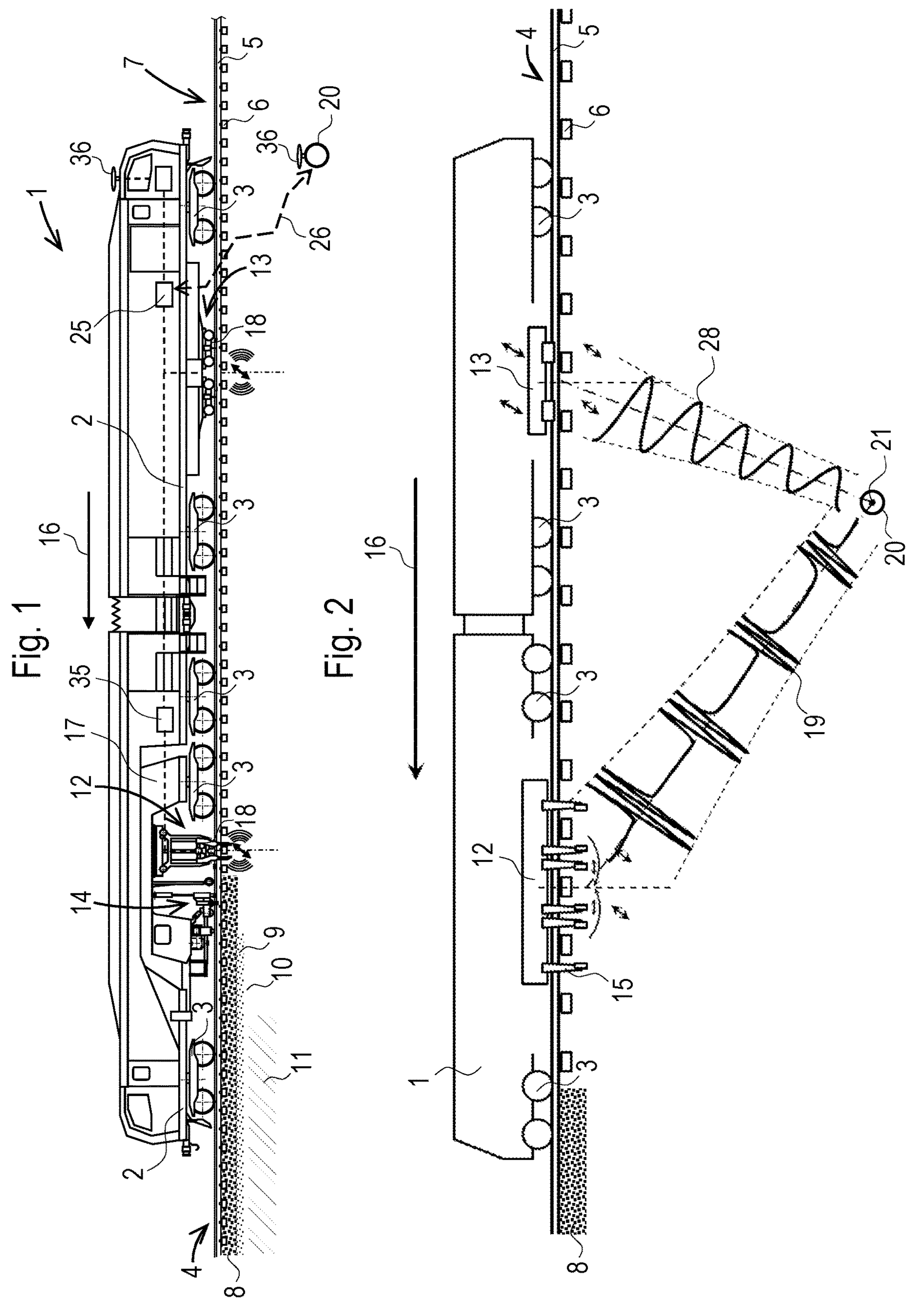
FIG. 1 Track maintenance machine with tamping unit and stabilising unit
FIG. 2 Track maintenance machine with vibration propagation

The track maintenance machine 1 shown in FIG. 1 is a combination of a tamping machine and a so-called Dynamic Track Stabiliser. The machine 1 comprises two coupled machine frames 2 movable on a track 4 on rail-based running gears 3. The track 4 comprises a track panel 7 consisting of rails 5 and sleepers 6 fixed thereon, which is supported in a bed of track ballast 8. Underneath this ballast bed, there is usually a formation protective layer (FPL) 9 which is, if necessary, applied with an intermediate layer 10 as a supporting layer made of recycled material on an earth formation or subsoil 11.

Work units are, for example, a tamping unit 12 and a stabilising unit 13. Other work units can also be used to introduce vibrations into the track 4, for example a sleeper-end compactor or a sleeper-crib compactor. The tamping unit 12 tamps the track ballast 8 below the track panel 7 while the latter is held in a target position by means of a lifting and lining unit 14. Specifically, the tamping process is carried out by means of tamping tines 15 arranged opposite each other in pairs, which penetrate the sleeper cribs between the sleepers 6.

The tamping unit 12 comprises a tamping unit frame in which a tamping tool carrier is mounted on vertical guide rods. Opposing tilting arms, which can be applied with vibration and squeezed towards each other, are mounted on the tamping tool carrier. For this purpose, an upper lever arm of the respective tilting arm is coupled to a vibration drive via an associated squeezing drive. For example, a hydraulic cylinder is connected to the associated tilting arm and at the same time mounted on a rotating vibration shaft. Alternatively, a hydraulic cylinder can be adapted for squeezing and for generating vibration. One or two tamping tines 15 are attached to a lower lever arm of the respective tilting arm.

The tamping tines 15 are dynamically excited by the vibration drive (dynamic closing and opening of a clamp formed of the opposing tamping tines 15). This dynamic excitation puts the track ballast 8 into a flow-like state. The dynamically mobilised track ballast 8 is tamped below the respective sleeper 6 by means of the superimposed squeezing process of the opposing tamping tines 15 (slow closing of the clamps).

As shown in FIG. 2, a tamping unit 12 can comprise several banks of opposing tamping tines 15 so that several sleepers 6 can be worked simultaneously. Each of these banks has its own vibration drive, with the frequency of the dynamic excitation being continuously varied to suit the work process. The individual banks of tamping tines are to vibrate with approximately the same frequency, whereby an exact synchronisation of the phase position is not absolutely necessary.

During a work process, the track maintenance machine 1 travels at a constant slow speed in the direction of work 16. A so-called satellite 17 mounted on the machine frame 2 and comprising the tamping unit 12 moves cyclically back and forth relative to the main machine. This way, the tamping unit 12 remains positioned above the respective sleeper 6 for the duration of one tamping process. After completing the tamping process, the satellite 17 is moved forward at increased speed in the direction of work 16 relative to the main machine. After this catching-up movement, the satellite 17 is braked and the tamping unit 12 is positioned exactly above the next sleeper 5 to be tamped.

At the beginning of the following tamping process, the opposing tamping tines 15 are lowered into the track ballast 8 with a high excitation frequency. In this phase, the vibration effect of the tamping unit 12 on the environment begins. Subsequently, the tamping tine pairs are slowly closed under lower excitation frequency (squeezing movement) and transport the dynamically mobilised track ballast 8 below the respective sleeper 6. In addition, the track ballast 8 located under the worked sleeper 6 is compacted. Finally, the tamping tine pairs are pulled out of the track ballast 8 with an opening movement as the tamping tool carriers of the tamping unit 12 move upwards. Specifically, the tamping tool carriers mounted in tamping unit frames in the tamping unit 12 are moved upwards. The vibration effect of the tamping unit 12 ends with the tamping tines 15 losing contact to the track ballast 8.

If necessary, the entire squeezing process described above can be repeated several times at one position. Afterwards, the satellite 17 catches up with the distance that the main machine covered in the meantime and positions itself exactly above the next sleeper 6 to be tamped.

The data relevant for the vibration effect of each individual position of the satellite 17 or the work unit 12 are measured by means of a sensor arrangement 18 or are known due to the process. These data include the time the tamping tines 15 contact the ground (lowering), the frequency of the vibration drive, the beginning and end of the squeezing movement, the loss of contact of the tamping tines 15 during lifting, and the current position of the tamping unit 12 in relation to the track 4.

Figure 3:
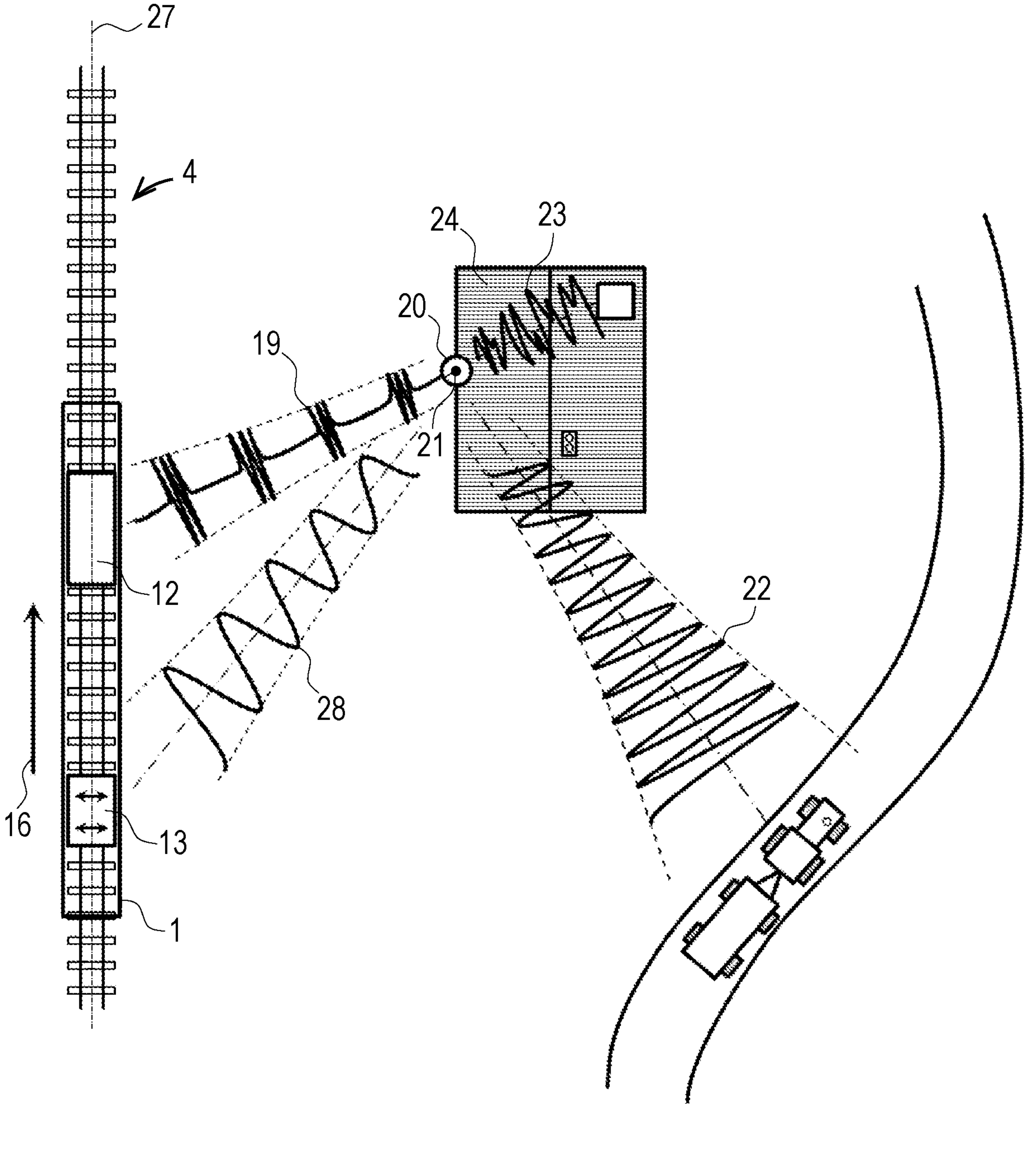
FIG. 3 Measuring layout in plan view

A characteristic feature for the vibration effect of the tamping unit 12 is its intermittent progression 19 (propagation of the vibrations caused by the tamping unit 12). The measurement curves of the vibrations 21 measured in the environment by means of a sensor 20 contain the superpositions of all vibrations from the operation of the track maintenance machine 1 and surrounding external and internal sources of vibration. FIG. 3 shows an example of vibrations 22 from an external interference source and vibrations 23 from an internal interference source located inside a monitored protected object 24. Due to the characteristic intermittent progression 19 and the exact knowledge of the contact time of the tamping tines 15 with the track ballast 8, it is possible to distinguish the vibration effect of the tamping unit 12 from the other measured vibrations.

Knowing the instantaneous position of the tamping unit 12 and the fixed position of the sensor 20, the instantaneous distance r between the emission source (work unit 12) and the measuring point (sensor 20) is known. Specifically, the positions are given to an evaluation device 25 in order to detect the current distance r. In addition, the vibration values detected by means of the sensor 20 are transmitted to the evaluation device 25. For this purpose, the sensor 20 is advantageously connected to the evaluation device 25 via a wireless data connection 26. A computer program is set up in the evaluation device 25, by means of which a correlation between the vibration effect of the work unit 12 detected by the sensor 20 and the distance r between the work unit 12 and the sensor 20 is calculated.

The stabilising unit 13 moves continuously with the track maintenance machine 1 in the direction of work 16 along the track 4. This stabilising unit 13 comprises a directional oscillator which applies a horizontal (in special cases also vertical) dynamic excitation perpendicular to the centre-line of track 27 with infinitely variable amplitude. The stabilising unit 13 is supported against the machine frame 2 by means of a hydraulic cylinder and presses with a defined force onto the track panel 7. In doing so, the stabilising unit 13 holds the rails 5 of the track 4 firmly in place by means of wheel-flange rollers (spreading axle) and clamping rollers (roller clamp). The vibration of the stabilising unit 13 caused by the dynamic excitation is thereby transmitted to the track 4 and thus to the environment.

The track 4 which has previously been placed into a new position by means of the lifting and lining unit 14 and the tamping unit 12 is vibrated into the track ballast 8 by means of the stabilising unit 13. In the process, the track ballast 8 is further compacted and thus the new track position is stabilised. Along with this process, the lateral resistance of the track 4 is increased. The vibrations 28 required for the compaction process propagate in the subsoil 11 (propagation of the vibrations caused by the stabilising unit 13). The resulting vibrations 21 can be measured in the environment by means of the sensor 20.

Several stabilising units 13 can also be used in succession. These are preferably mechanically coupled so that they are forcibly synchronised in phase with each other. With an appropriate distance of the sensor 20 (location of observation) from the synchronised stabilising units 13, the vibration effect of the stabilising unit cannot be distinguished from that of a correspondingly large, fictitious single unit. Therefore, only the effect of a single stabilising unit 13 will be described in the following. However, the principle applies to several synchronised (optionally also non-synchronised) stabilising units 13.

The characteristic of the vibration of the stabilising unit 13 is characterised in that it is a harmonic (sinusoidal) excitation. The frequency and phase position can be detected precisely by means of a sensor arrangement 18 or are known due to the process. The vibration effect of the stabilising unit 13 can be clearly distinguished from other influences on the measuring point when analysing the vibrations 21 by means of the sensor 20 (measuring point). From the instantaneous position of the stabilising unit 13 and the fixed position of the sensor 20, the instantaneous distance r between the emission source (work unit 12) and the measuring point (sensor 20) can be detected. By means of the evaluation device 25, this distance r is correlated with the detected vibration effect of the stabilising unit 13.

In this method, the tamping unit 12 and the stabilising unit 13 are defined as primary sources of vibration. Due to the described characteristics of the vibrations caused by these sources 12, 13, a separation from the rest of the secondary sources of vibration of the track maintenance machine 1 (ambient noise) and external influences acting at the measuring point takes place. For this separation, a computer program is set up in the evaluation device 25 which examines the progression of the residual vibrations while the track maintenance machine 1 is approaching the sensor 20 (measuring point) and moving away from it.

With increasing data, especially with several sensors 20 (numerous measuring points), the characteristic patterns of the primary sources of vibration 12, 13 and the secondary sources of vibration of the track maintenance machine 1 become increasingly clear. The vibrations attributable to the track maintenance machine 1 can thus be clearly distinguished from the vibrations of external sources of vibration (traffic, other machines, etc.). As a result, the processing capacity required to separate the sources of vibration decreases as the procedure progresses.

Figure 4:
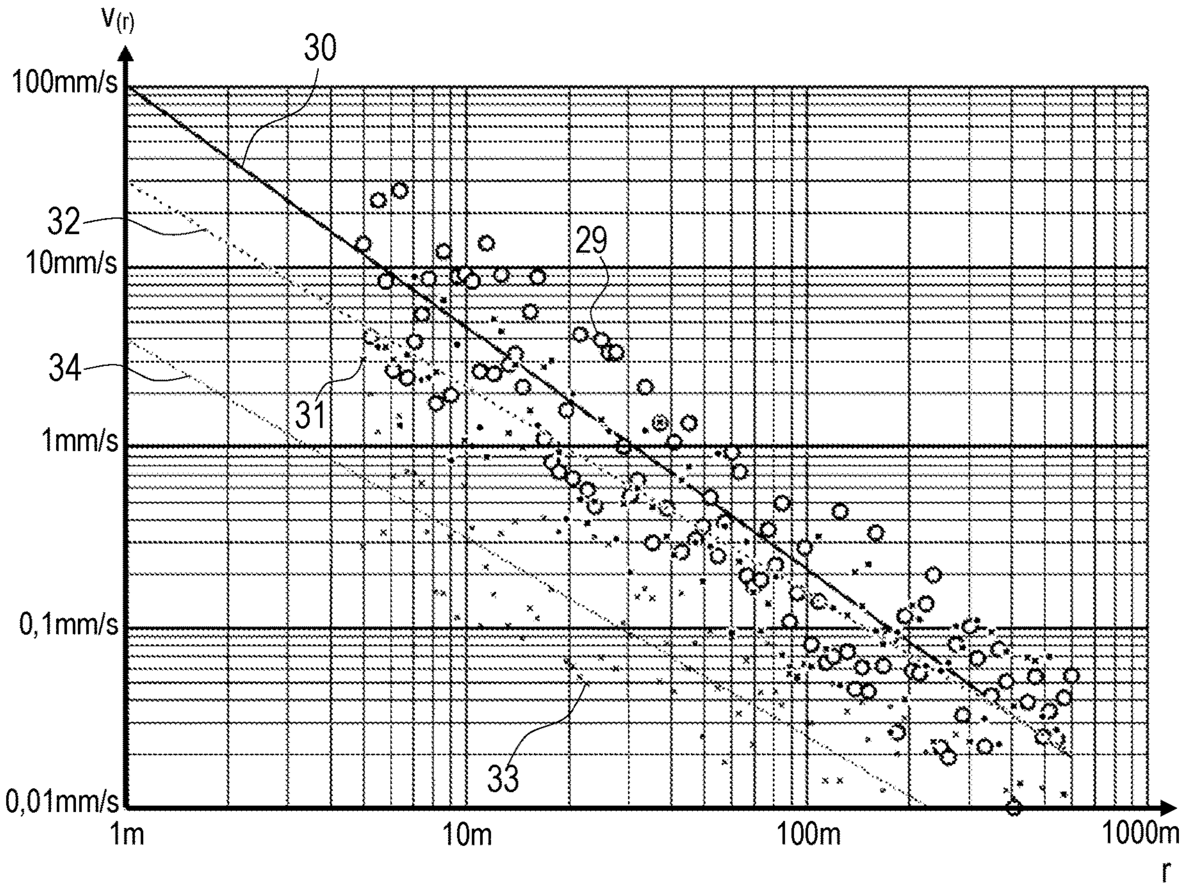
FIG. 4 Diagram of the vibration propagation

In FIG. 4 the correlations between the vibrations and the distance of the dynamic excitation to the position of the measurement are sketched in an idealised way in a double logarithmic diagram. Specifically, the distance r between the source of vibration (work unit 12, 13) and the sensor 20 is plotted on the abscissa. The vibration velocity $v_{(r)}$ is plotted on the ordinate as the field size of the vibration. Measuring values 29 of the vibrations of the tamping unit 12 are drawn with small circles. A function 30 of the vibration propagation of the vibrations caused by the tamping unit 12 is drawn as a solid line. This line results from the best fit of an exponential decay function to the measuring values 29 and is a straight line in the double logarithmic diagram.

Measuring values 31 of the vibrations of the stabilising unit 13 are drawn with small circles. A fixed setting of the amplitude is assumed. A function 32 of the vibration propagation of the vibrations caused by the stabilising unit 13 is drawn as a thick dotted line and results from the associated best fit.

Measuring values 33 of the vibrations of the track maintenance machine 1 (ambient noise) attributable to secondary sources are drawn as small crosses. A function 34 of the vibration propagation of the secondary vibrations is drawn as a thin dotted straight line and in turn results from the associated best fit.

The relationships shown in FIG. 4 can be evaluated by means of a computer program, which is implemented in the evaluation device 25. This will provide quick and accurate forecasts of the vibrations to be expected in real time and on site. Based on these forecasts, a decision is made by means of an algorithm as to whether measures to reduce the vibrations will be required if the protected object 24 monitored by the sensor 20 is approached further. For example, the algorithm compares the current measuring values with a threshold value that must not be exceeded.

To influence the vibrations, the evaluation device 25 is coupled with a machine control 35. For example, if the limiting value is threatened to be exceeded, the machine control 35 is given a reduction of a vibration amplitude. The result of this measure is the lowering of the amplitude of the tamping unit 12 and/or the stabilising unit 13. The effectiveness of the measure is immediately apparent from the continuously detected measuring values 29, 31, 33.

The documentation of compliance with the previously defined guide and limiting values is done based on the measured value curves; exceedances as a result of external influence can be marked. Thus, the method allows a demonstrably reproducible allocation of the measured vibrations 21 to the excitation sources (tamping unit 12, stabilising unit 13, secondary sources of vibration of the track maintenance machine 1 as well as external excitation sources that do not fall within the sphere of the track maintenance machine 1).

The stationary sensors 20 are used to measure acceleration or vibration velocity $v_{(r)}$ in three orthogonal spatial directions. The measuring values 29, 31, 33, which may already have been partially analysed locally, are wirelessly sent to the evaluation device 25 of the track maintenance machine 1 together with the position of the respective sensor 20 for evaluation. For example, each sensor 20 is arranged together with a GNSS receiving device 36 in a common housing. The evaluation device 25 may be integrated into an existing processing unit of the track maintenance machine 1.

On the track maintenance machine 1, further data is recorded at the tamping unit 12 by means of a sensor device 18. Specifically, the acceleration of at least one tamping tine 15, the progression of the vibration frequency as well as the times of the contact phases (beginning and end of the contact duration of the tamping tine 15 with the track ballast 8) are recorded. A method and a device for detecting these data are disclosed in publication AT 520 056 A1 of the same applicant. In addition, the current position of the tamping unit 12 is recorded by means of a GNSS receiving module 36 and/or by internal measurement.

In the directional oscillator of the stabilising unit 13, rotating unbalances are usually used for generating vibration. The positions of these unbalances (phases) and the acceleration of the vibrations transmitted to the track panel 7 are measured, for example, by means of a sensor arrangement 18. Likewise, an instantaneous setting of the infinitely variable amplitude and the instantaneous position of the stabilising unit 13 are recorded (GNSS receiver 36 and/or internal measurement).

A peak value y r of the vectorially added vibration velocities can be used as an assessment criterion for the vibration. This value is derived from applicable guidelines and standards (e.g. ÖNORM S 9020, Vibration protection for facilities above and below ground):

$$v_r = \sqrt{v_x^2 + v_y^2 + v_z^2}$$

Here, $v_x$, $v_y$, and $v_z$ are the measured vibration velocities in the three orthogonal spatial directions. Other assessment parameters such as the weighted vibration severity $KB_F(t)$ according to DIN 4150-2 can also be used.

The following formula is applicable as an exponential propagation law (decay function):

$$v_{(r)} = v_{(1)} \cdot r^D$$

$v_{(r)}$ . . . vibration velocity (peak value of the vectorially added spatial components) at a distance r between excitation source and position of the forecast;

$v_{(1)}$ . . . theoretical vibration velocity at a distance of 1 metre (the propagation law, however, only applies in the far field);

D . . . decay exponent (inclination of the regression line in the double logarithmic diagram in FIG. 4).

In addition to the simple propagation law according to the formula provided, other propagation laws or spline functions (best fit) can also be used.

With the sensors and methodology used according to the invention, it is possible to correlate the measurements at the track maintenance machine 1 and those at instrumented fixed points in real time, taking into account the geometric conditions (distance), and thus to reliably and verifiably prevent impermissible vibrations caused by the track maintenance machine 1.

In the method with reference to FIG. 3, sensors 20 are attached to the object to be protected (residential properties, buildings, other structures susceptible to vibrations, etc.) in advance or during the track maintenance. In the case of a sensor 20 being covered and a determination of its position not being possible automatically by means of GNSS, the position of the sensor 20 or the distance to the work units 12, 13 is entered manually.

Figure 5:
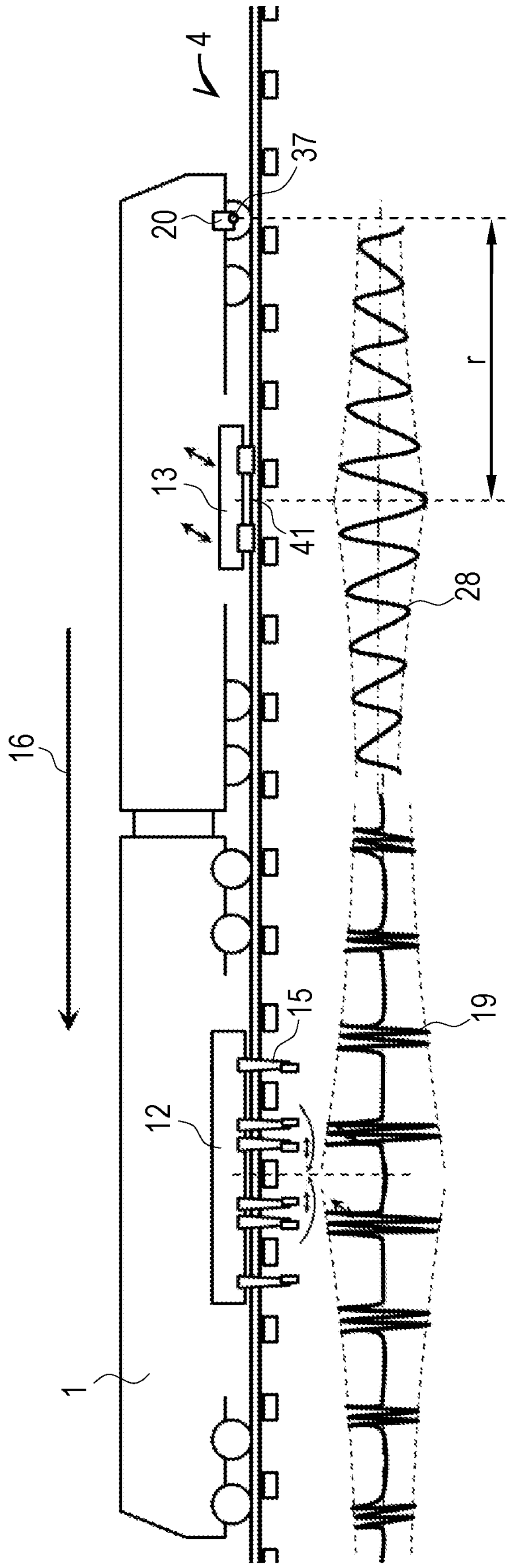
FIG. 5 Vibration propagation in longitudinal direction

In another method encompassed by the invention, a vehicle-based measurement of the system rigidity of the track 4 is carried out. In order to carry out such a vehicle-based measurement of the vibration propagation in the longitudinal direction of the track maintenance machine 1, selected measuring axles 37 are equipped with a sensor 20. This sensor measures the vibrations at a distance r from the respective work unit 12, 13. During this, the respective distance $r_1$ between the measuring axles 37 or sensors 20 and the stabilising unit 13 remains constant. In an arrangement with a satellite 17, the distance to the tamping unit 13 is variable but always known. FIG. 5 demonstrates this measuring principle using the instrumentation of a single measuring axle 37 as an example.

Due to the known and constant frequency of the stabilising unit 13 (horizontally and/or vertically excited), it is possible to separate the corresponding frequency contents from a measuring signal of the sensor 20 from other vibrations and to analyse them. In this process, the amplitudes of the signals are detected and the phase positions to the dynamic excitation by the stabilising unit 13 are examined. Any changes in the vibrations can be easily attributed to the track 4 and the subsoil 11 if the process parameters of the track maintenance machine 1 are kept constant (driving speed, frequency, amplitude, contact pressure, etc.). The more rigid the track panel 7 and the subsoil 11, the higher is the propagation speed of the surface waves. The homogeneity of the load-bearing behaviour of the track 4 can thus be checked in a work-integrated manner.

Taking into account the dispersion of the surface waves (different propagation speed of different frequencies) as well as the variable distance, the vibrations of the tamping unit 12 can additionally or alternatively be used for the rigidity analysis.

Several measuring axles 37 (axes of the rail-based running gears 3 with sensors 20) allow a reliable determination of the wave field as well as the propagation speed of the vibrations and thus the homogeneity of the rigidity conditions.

Figure 6:
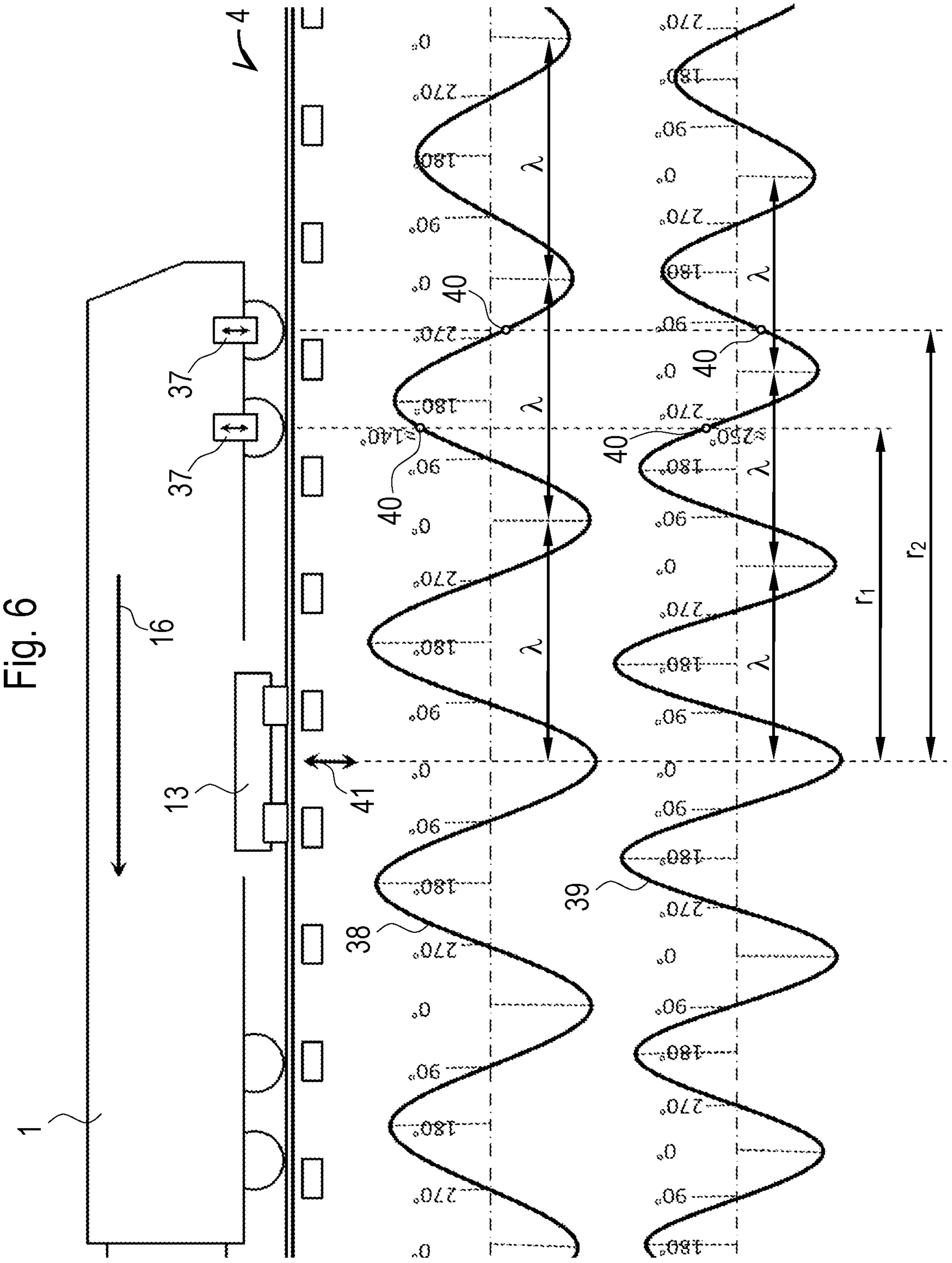
FIG. 6 Phase position of the vibration propagation

The measuring principle is explained with reference to FIG. 6. In the rear part of the track maintenance machine 1, which moves at a constant speed, the stabilising unit 13 is located, which excites the track panel 7 vertically at a constant frequency. The machine 1 travels along the track panel 7, which has a defined mass and a defined bending rigidity in the respective dynamic excitation direction (e.g. vertical). The more rigid a bending beam, the faster the propagation speed of the waves and the longer the wavelength λ. Due to wave dispersion, high-frequency waves have a greater propagation speed in the bending beam than low-frequency waves.

The track panel 7 rests on the ballast bed 8, the superstructure of the track 4, as well as the substructure and the subsoil 11. The more rigid the entire set-up, the faster the propagation speed of the waves and the longer the wavelength λ. According to the half-space theory, however, an opposite relationship to the bending beam also applies. Due to wave dispersion, high-frequency waves have a lower propagation speed in the elastic-isotropic half-space than low-frequency waves.

The real vibration state of the dynamic interaction system, which comprises the following system components, is measured spot by spot: Stabilising unit 13 (defined excitation), track panel 7, layered structure (superstructure, substructure), subsoil 11 as well as sprung wheelsets of the rail-based running gears 3. Sensors 20 are attached at defined positions on the track maintenance machines 1. For example, axles of the sprung wheelsets are designed as measuring axles 37. Alternatively, a non-contacting optical or other measuring system can be used to detect the vibrations. Advantageously, a numerical model of this interaction system is calculated in the evaluation device 25 by means of a computer program adapted for this purpose. This numerical model is subsequently used to predict the vibration effect of the work units 12, 13 in the environment of the track maintenance machine 1.

The surface waves are shown in an idealised manner for a rigid behaviour (vibration shape 38) and for a smooth behaviour (vibration shape 39) of the interaction system. This shows that the wavelength λ is longer under more rigid conditions than under smooth conditions. In both cases, the phase position is recorded with respect to the excitation (0°, 90°, 180°, 270°, etc.).

Due to the spot measurement, the entire sketched waveform is not directly visible, but only a respective phase position 40 at the measuring points 37 is known. In the steady state with constant frequency, it is unknown for the time being how many integer multiples of 360° lie between an excitation point 41 and the respective measuring point 37. However, by pursuing the start-up process or by a targeted frequency variation, this can be identified and the absolute wavelength λ can be detected.

The more measuring axles 37 are arranged, the clearer and more accurate is the determination of the wavelengths λ. By means of a numerical simulation of the entire interaction system, measuring results can be interpreted accordingly.

A simple but highly accurate assessment of the changes in the rigidity ratios of the interaction system is already possible with a single measuring point 37, without the necessity to know the exact parameters of the entire interaction system. If the phase position 40 changes because the conditions become smoother, the upper vibration shape 38, for example, changes to the lower vibration shape 39. At the front measuring point 37, this change would be noticeable with an increase in the phase angle from approx. 140° to approx. 250°.

In this way, recognising the change in rigidity (relative measurement) is already reliably possible by observing the phase position 40 at a single measuring point 37, as an increasing phase angle is an indicator of a decrease in the system rigidity and vice versa. The zero crossings are counted continuously. They describe the change in the number of wavelengths λ within the distance r between excitation point 41 and measuring point 37.

The changes in the overall system rigidity can be attributed to the changes in the track bed (superstructure, substructure, and subsoil) if the machine parameters remain unchanged and if it is ensured by checking the rail fastenings that the track panel 7 has constant rigidity properties.

The stabilising unit 13 can be used for a non-contacting check of the rail fastenings. In this, varying spreading forces are exerted on the rails 5 by means of a spreading axle of the stabilising unit 13. At the same time, the current track gauge of the track panel 7 is continuously detected at the excitation point 41 by means of suitable sensors. Occurring changes in the track gauge allow conclusions to be drawn about the condition of the rail fastenings. For example, a loose rail fastening with an acting spreading force as a result of a rail head deflection leads to an increase in the measured track gauge.

A vibration transmission from the exciter (stabilising unit 13) via the frame of the track maintenance machine 1 to the measuring axle 37 can be avoided by a dynamic decoupling.

The described method of the vehicle-based measurement is one of several assessment methods using a track maintenance machine 1. Further methods are disclosed in AT 520 056 A1 and in AT 521 481 A1 of the same applicant. Due to the different sensitivity and the different measured area of track 4, advantages result from a multidisciplinary interpretation of the track condition. Different inhomogeneities detected by the individual methods can be better interpreted in a comprehensive view. In particular, the individual construction elements of the track 4 can be assigned in a better way. In this way, the present invention contributes to improving the real-time assessment of the track condition as a whole.

The invention claimed is:

1. A method for detecting vibrations transmitted in an area of a track, which comprises the steps of:

vibrating the track during a work process by means of a work unit of a track maintenance machine travelling along the track;

measuring the vibrations transmitted via the track by means of a sensor distanced from the work unit;

evaluating measuring data of the sensor in an evaluation device;

providing characteristic parameters of a vibration generated by the work unit to the evaluation device and that the measuring data are compared with the characteristic parameters;

providing a position of the sensor with respect to the work unit to the evaluation device; and calculating a correlation between a vibration effect of the work unit detected with the sensor and a distance between the work unit and the sensor in the evaluation device.

2. The method according to claim 1, which further comprises measuring an acceleration and/or a vibration velocity by means of the sensor to detect the vibration effect of the work unit.

3. The method according to claim 1, which further comprises transmitting the measuring data of the sensor to the evaluation device via a wireless data connection.

4. The method according to claim 1, which further comprises vibrating the track by means of several work units of the track maintenance machine at points that are distanced from each other, and that the measuring data are assigned to a respective work unit of the work units on a basis of respective characteristic parameters of the vibration generated by the respective work unit.

5. The method according to claim 1, which further comprises controlling automatically the track maintenance machine in dependence on an output value of the evaluation device.

6. The method according to claim 1, which further comprises transmitting position data of the sensor to the evaluation device via a wireless data connection.

7. A method for detecting vibrations transmitted in an area of a track, which comprises the steps of:

vibrating the track during a work process by means of a work unit of a track maintenance machine travelling along the track;

measuring the vibrations transmitted via the track by means of a sensor distanced from the work unit;

evaluating measuring data of the sensor in an evaluation device;

providing a position of the sensor with respect to the work unit to the evaluation device;

calculating a correlation between a vibration effect of the work unit detected with the sensor and a distance between the work unit and the sensor in the evaluation device; and deriving a transmission function and/or a decay function from the correlation detected by means of the evaluation device.

8. The method according to claim 7, which further comprises calculating a continuous vibration forecast by means of the evaluation device using the transmission function and/or the decay function.

9. A method for detecting vibrations transmitted in an area of a track, which comprises the steps of:

vibrating the track during a work process by means of a work unit of a track maintenance machine travelling along the track;

measuring the vibrations transmitted via the track by means of sensors distanced from the work unit;

evaluating measuring data of the sensors in an evaluation device;

providing a position of each of the sensors with respect to the work unit to the evaluation device; and calculating a correlation between a vibration effect detected and a distance between the work unit and a sensor in the evaluation device for each of the sensors.

10. A method for detecting vibrations transmitted in an area of a track, which comprises the steps of:

vibrating the track during a work process by means of a work unit of a track maintenance machine travelling along the track;

measuring the vibrations transmitted via the track by means of a sensor distanced from the work unit;

evaluating measuring data of the sensor in an evaluation device;

providing a position of the sensor with respect to the work unit to the evaluation device;

calculating a correlation between a vibration effect of the work unit detected with the sensor and a distance between the work unit and the sensor in the evaluation device;

controlling automatically the track maintenance machine in dependence on an output value of the evaluation device;

comparing the output value with a threshold value, and that a process parameter of the work process is changed, when the output value approaches the threshold value.

11. A method for detecting vibrations transmitted in an area of a track, which comprises the steps of:

vibrating the track during a work process by means of a work unit of a track maintenance machine travelling along the track;

measuring the vibrations transmitted via the track by means of a sensor distanced from the work unit;

detecting a vibration propagation in a longitudinal direction of the track by means of the sensor being disposed on the track maintenance machine;

evaluating measuring data of the sensor in an evaluation device;

providing a position of the sensor with respect to the work unit to the evaluation device; and calculating a correlation between a vibration effect of the work unit detected with the sensor and a distance between the work unit and the sensor in the evaluation device.

12. A method for detecting vibrations transmitted in an area of a track, which comprises the steps of:

vibrating the track during a work process by means of a work unit of a track maintenance machine travelling along the track;

measuring the vibrations transmitted via the track by means of a sensor distanced from the work unit;

evaluating measuring data of the sensor in an evaluation device;

providing a position of the sensor with respect to the work unit to the evaluation device;

calculating a correlation between a vibration effect of the work unit detected with the sensor and a distance between the work unit and the sensor in the evaluation device;

calculating a numerical model of an interaction system formed by the track maintenance machine and the track; and calculating soil-mechanical parameters by means of the numerical model.

13. A system, comprising:

a track maintenance machine having a work unit for vibrating a track travelled on by said track maintenance machine;

a sensor distanced from said work unit to measure vibrations transmitted via the track, said sensor outputting measuring data defining the vibrations measured; and said track maintenance machine further having an evaluation device that is given a position of said sensor with respect to said work unit, and said evaluation device is set up to calculate a correlation between a vibration effect of said work unit detected with said sensor and a distance between said work unit and said sensor, said evaluation device receiving characteristic parameters of a vibration generated by said work unit and the measuring data are compared with the characteristic parameters.

14. The system according to claim 13, further comprising a position detection system;

further comprising a transmitter; and wherein said sensor is coupled with said position detection system and said transmission device for transmitting position data, and that said track maintenance machine has a receiver device for receiving the position data.

15. The system according to claim 13, wherein said sensor is disposed on said track maintenance machine.

16. The system according to claim 15, wherein:

said track maintenance machine has rail-based running gear; and said sensor is an acceleration sensor disposed on said rail-based running gear.

* * * * *